July 26, 1938.　　　C. SAUZEDDE　　　2,125,129
HYDRAULIC BRAKE ACTUATOR
Filed Feb. 24, 1936　　　2 Sheets-Sheet 2
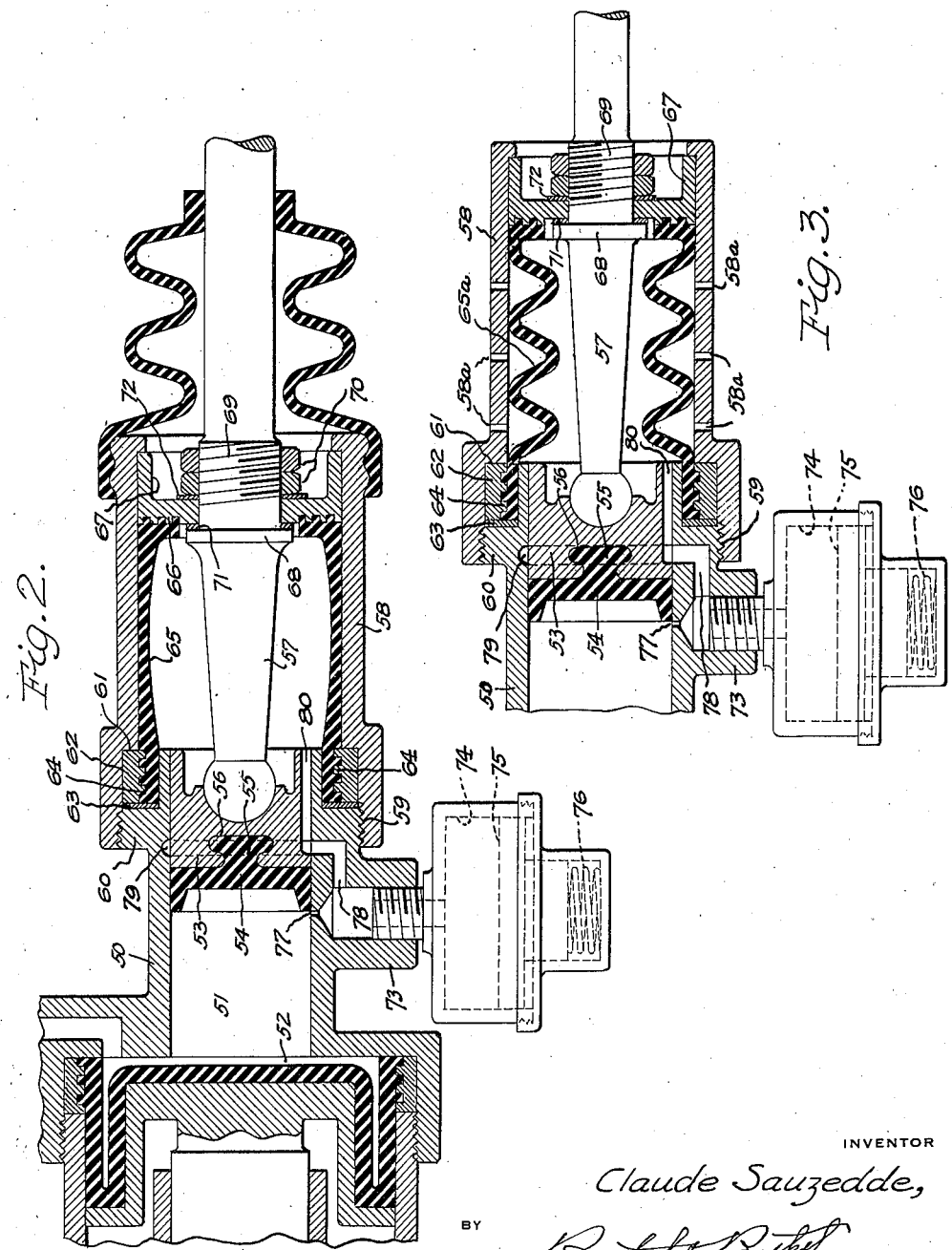
INVENTOR
Claude Sauzedde,
BY
ATTORNEYS Patented July 26, 1938

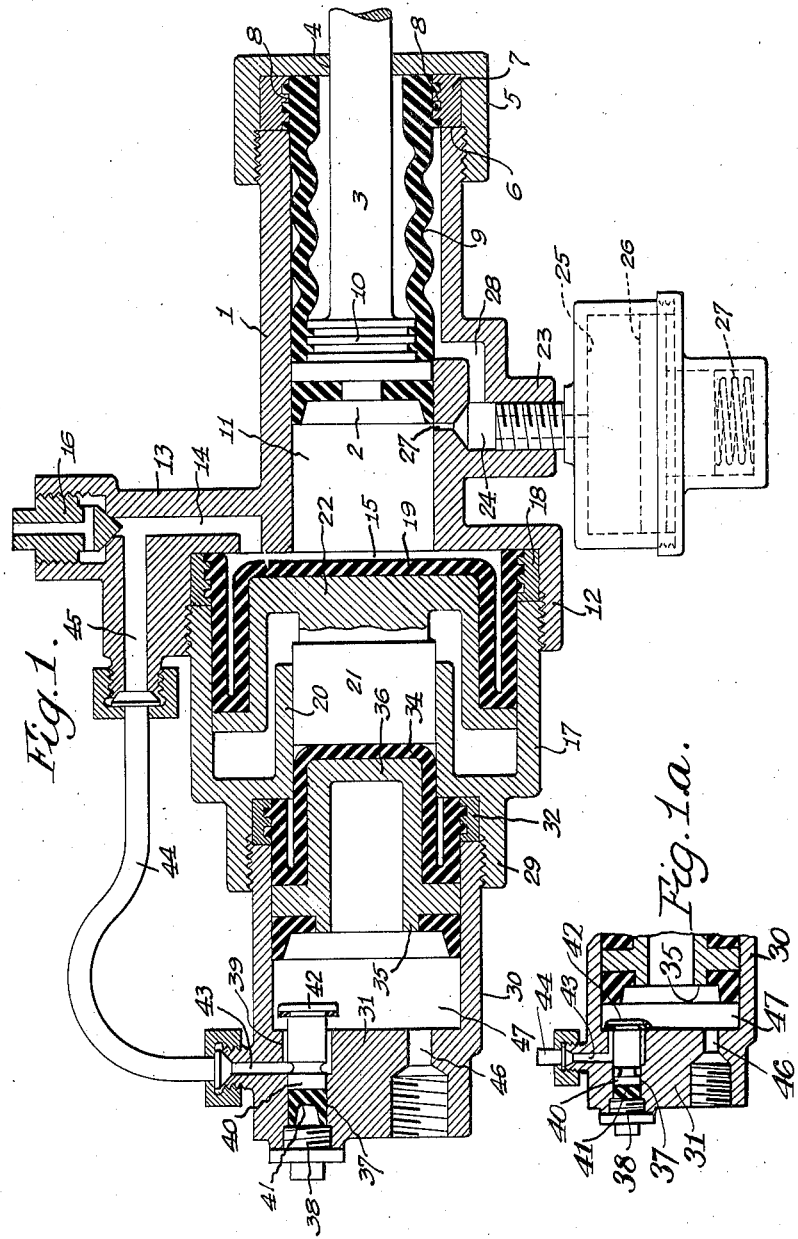

2,125,129

UNITED STATES PATENT OFFICE 2,125,129

HYDRAULIC BRAKE ACTUATOR

Claude Sauzedde, Detroit, Mich., assignor to Detroit Hydrostatic Brake Corporation, Detroit, Mich., a corporation of Michigan Application February 24, 1936, Serial No. 65,436

9 Claims. (Cl. 60—54.6)

The present invention relates to a device, commonly known in the art as a compressor, for manually applying pressure on fluid in a hydrostatic brake system for the purpose of applying the brakes of the system, and more particularly non-self-energizing brakes.

The primary object of the present invention is to provide means for applying the brakes of a hydrostatic brake system that may be manually operated by a comparatively small amount of pedal movement and yet while incorporating but a small pedal movement provides for a mechanical advantage which facilitates full application of the brakes while requiring only a minimum amount of effort on the part of the operator in moving the pedal. The present actuator is applicable to hydrostatic brake systems of automobiles and also to heavy duty highway vehicles such as trucks wherein the systems in addition to embodying large brakes, as compared with automobile brakes, very often include more than four brakes. In considering the fact that each brake embodies a piston movable in a chamber in response to fluid pressure, and in many cases that two or more of such pistons are provided in each brake mechanism, it becomes apparent that considerable fluid is required to move the pistons from their position of rest where they hold the brake shoes retracted to their position where they move the shoes into engagement with the braking surfaces. This condition presents a problem when considered in the light of the limitations with respect to the amount of pedal movement which is possible and yet if the brake pedal movement is shortened to conform with such limitations a large area piston must be employed in the brake actuator and the amount of pressure required at the pedal is materially increased. In addition, after the brake system has been in use for a short time wear results and the amount of movement necessary to apply the brakes is increased to an extent equal to the wear, and as the amount of movement in this respect increases the amount of fluid required to cause such movement increases, not correspondingly, but multiplied by the number of brakes, or the number of pistons in the brakes in cases where more than one piston is present in each brake.

An important object of this invention is to provide an actuator which meets with the conditions of the problem as outlined above and more particularly the wear conditions in such manner that adjustments are not frequently required. To this end a hydrostatic brake actuator is provided which functions in response to a pedal movement considerably smaller than that ordinarily required so that when wear takes place and additional pedal movement becomes necessary such additional pedal movement is possible.

Another important object of the invention is to provide a hydrostatic brake actuator embodying a "booster" action. It comprises a primary fluid pressure chamber from which fluid is forced upon movement of the brake pedal to move the brake shoes of the system from their retracted position to a position of engagement with their braking surfaces. At the time the brake shoes engage their braking surfaces back pressure is built up on the fluid and this back pressure automatically disconnects the primary chamber from fluid communication with the brakes so that the application of pressure on the pedal causes the fluid in the primary chamber to act upon a comparatively large diameter piston. The large diameter piston in turn transmits its accumulated pressure to a small diameter piston in a chamber which is in fluid communication with the brakes and the fluid in the system therefore has a mechanical advantage over the fluid in the primary chamber. The large diameter piston has no function until the clearances between the shoes and braking surfaces have been entirely taken up and therefore the actual amount of movement of the large diameter piston is very small, due to the fact that it acts upon a solid column of liquid. Ordinarily springs are provided to retract the brake shoes and therefore the only back pressure opposing movement of the pedal is that exerted by these springs and inasmuch as this pressure is comparatively low a piston may be employed in the primary chamber which is sufficiently large to provide for displacement of sufficient liquid to initially apply the brakes without requiring an objectionable amount of pressure on the pedal, and in addition the pedal need not have any great mechanical advantage and its movement may therefore be short.

Still another important object of the present invention is to provide a sealing means between the piston in the above referred to primary chamber and the wall of the cylinder in which it operates, to positively prevent leakage of fluid from the end of the cylinder through which a connecting rod extends to be connected to a pedal for the purpose of causing movement of the piston and for applying pressure thereto, and also for the purpose of preventing the formation of a partial vacuum in the cylinder which might become filled with air, which being compressible, would form a cushion. To accomplish this sealing action the invention provides an elastic skirt having one end secured to and positively sealed with respect to the wall of the cylinder, and having its other end attached to the piston rod and sealed with respect thereto at a point spaced from the piston. In combination with the skirt so arranged means is provided which functions when the piston is in its inactive position to maintain the chamber on both sides of the piston filled with fluid, preferably at a pressure slightly higher than atmospheric pressure so as to preclude any tendency for outside air to seep into the actuator. When the piston is moved, through application of pressure on the brake pedal, the chamber in advance of the piston is automatically disconnected from the above mentioned means, while the chamber on the other side of the piston remains in communication and the means which functions to maintain the minimum pressure compensates for any change in volume of the space within the skirt by receiving excess liquid when the volume is reduced and by supplying additional liquid thereto when the volume therein increases.

With the above and other ends in view the invention is more fully disclosed with reference to the accompanying drawings, in which—

Figure 1 is a vertical section of an actuator;

Fig. 1a is a fragmental section corresponding to Fig. 1 and showing the control valve in a closed position;

Fig. 2 is a fragmental section illustrating a modified seal, and

Fig. 3 is a fragmental section illustrating another form of seal.

Like characters of reference are employed throughout to designate corresponding parts.

The numeral 1 designates the wall of a cylinder in which a piston 2 is slidably received. Connected to the piston 2 is a rod 3, the end of the rod being extended through a central bore 4 in a cap 5 received on the screwthreaded end of the wall 1. Tightly interposed between the end 6 of the body 1 and the cap 5 is an annular sealing element 7 having its inner surface provided with serrations 8. An elastic skirt 9 has one end thereof bonded to the annular sealing element 7, the skirt preferably being formed of rubber and vulcanized to the serrated surface 8 of the element 7. The piston 2 has an axially located externally serrated boss 10 to which the other end of the skirt 9 is vulcanized. The chamber within the cylindrical wall 1 in advance of the piston 2 is designated by the numeral 11 and will hereinafter be known as the primary chamber.

As its open end the cylindrical wall 1 is provided with an annular extension 12 and adjacent thereto a radial extension 13 through which a passage 14 extends to communicate with the interior of the annular body 12. The chamber within the annular body 12 is designated by the numeral 15 and is hereinafter termed the secondary or "booster" chamber. The outer end of the passage 14 is closed by a conventional air bleeder valve 16.

The annular extension 12 is internally threaded adjacent to its outer end and received in the screwthreaded end is an annular body 17. An internally serrated ring 18 is tightly interposed between the end of the annular body 17 and the bottom of the annular extension 12 and a cup shaped rubber seal 19 is vulcanized to the serrated surface of the ring 18. The annular body 17 is formed with an axially located guide 20 receiving a stem 21 in such manner as to slidably support a piston 22 within the cup-shaped seal 19. The two chambers 11 and 15, containing pistons 2 and 22 respectively, communicate with each other and with the passage 15.

The cylindrical wall 1 is provided with a radial extension 23 having a passage 24 therein. Supported by the extension 23 is a chamber forming body 25 in which is provided a plunger 26 and a spring 27 acts upon the plunger in such manner that the normal tendency is for the plunger to expel liquid contained in the body into the passage 24. Communicating with the passage 24 is a port 27 which opens into the chamber 11, at a point in advance of the piston 2, and a second port 28 which opens into the interior of the wall 1 at the rear of the piston 2, externally of the skirt 9.

The annular body 17 has a co-axial annular extension 29 having its outer end internally threaded and receiving a cylinder 30 which is closed at its outer end by an integral wall 31. Between the inner end of the cylinder 30 and the bottom of the extension 29 is a ring shaped sealing element 32, the inner surface thereof being serrated and having the end of a cup-shaped rubber seal 34 vulcanized thereto. In the cylinder 30 is a piston 35 having an axial protuberance 36 received in the cup-shaped seal 34. The cup-shaped seal 34 is thus disposed between the axial protuberance 36 and the stem 21 supporting the piston 22 and it becomes apparent that it may deform to permit the stem 21 to push the piston 35 or to permit the protuberance to push the stem 21 if pressure is applied to the piston 22 or the piston 35 respectively. The method by which pressure is applied to these parts will become apparent as the description progresses.

The end wall 31 is provided with a bore 37 opening through the outer surface thereof and normally closed by means of a plug 38. The bore 37 communicates with a co-axial bore 39 of larger diameter which extends through the inner surface of the wall 31. In the bore 37 is slidably received a valve stem 40 and a combined rubber spring and seal 41 is interposed between the inner end of the stem 40. The outer end of the stem 40 is provided with a valve head 42 adapted under conditions to be presently described to seat on the orifice of the bore 39. Extending radially through the wall of the cylinder 30 is a port 43 which is connected by a pipe line 44 to a passage 45 extending through the radial extension 13 to the passage 14 therein. The end wall 31 also has a port 46 extending therethrough and adapted to be connected by fluid conveying means to the brakes of a hydrostatic brake system to connect the chamber 47, hereinafter termed the high-pressure chamber, to the brakes of such system.

With the parts of the above described actuator in the inactive position shown in Fig. 1, assuming that the port 46 is connected to a hydraulic brake system, the device will be maintained filled with liquid under pressure equal to the pressure exerted by the spring 27. The spring 27 is preferably formed so that it exerts a pressure slightly greater than atmospheric pressure but considerably less than the springs which ordinarily are present for retracting the brake shoes. When pressure is applied to the rod 3, manually, through means well known to the art and usually comprising a brake pedal, the piston 2 is advanced in the chamber 11 from which it expels liquid into the chamber 15, through the passages 14 and 45 to the pipe line 44, through the port 43 and bore 39 to the chamber 47 and finally out the port 46 to the brakes. The liquid thus expelled from the actuator actuates the brakes, against the opposition of their retracting springs, and moves them to a position of initial engagement. The pressure present upon the liquid up until the time of initial engagement of the brake shoes is obviously equal throughout the entire system and the rubber spring 41 is made sufficiently strong that it will not collapse under such pressure, that is, the pressure of the brake retracting springs. When the brakes are moved into initial engagement further movement of the liquid is impossible so that an increased application of pressure on the rod 3 results in an increased pressure throughout the entire system, and this increase in pressure causes the spring 41 to collapse to permit movement of the valve stem 40 to the position shown in Fig. 1a so that the valve 42 seats on the orifice of the bore 39. The chamber 47 is thus removed from communication with the chamber 11 with the result that the fluid under pressure in the chamber 11 acts upon the large "booster" piston 22. The accumulated pressure acting upon the large piston 22 is transmitted to the relatively small piston 35 so that the latter exerts a higher pressure per square inch than does the piston 2. A mechanical advantage is thus provided which permits the present actuator to build up a comparatively high braking pressure with a comparatively small amount of pressure on the actuating means or pedal, this being possible because the means which provides for the mechanical advantage becomes operative at a time when further movement of fluid cannot take place, or if any movement does take place it amounts to only a few thousandths of an inch.

After the pressure is removed from the rod 3 the parts resume their normal or inactive position due to the reverse flow of fluid, which is expelled from the brakes by the shoe retracting springs provided therein and not shown here. Conventional brake pedals usually have springs also, for the purpose of moving the pedal to its normal position when pressure is removed therefrom, and the pedal spring will tend to move the piston 2 to its position of rest shown. In addition, the cup seals 19 and 34 are preformed to the shape shown, and therefore in the absence of pressure in the device they tend to move to the position shown and carry the pistons 22 and 36 therewith.

Referring to Fig. 2, the numeral 50 designates an actuator body formed with a cylindrical chamber 51 which communicates with a "booster" chamber 52 in the manner above described. Reciprocally mounted in the chamber 51 is a piston 53 having a rubber seal 54 retained on the face of the piston by an integral nipple 55 which engages the wall of a cavity 56 in the face of the piston. Engaging the rear face of the piston 53 is a rod 57 which extends through the open end of a housing 58 having a screwthreaded end 59 received on the externally threaded portion 60 of the body 50. The housing 58 is provided with an internal shoulder 61 and when it is assembled on the body 50 an annular metallic seal member 62 is tightly interposed with a second annular sealing member 63 between the portion 60 of the body 50 and the internal shoulder 61 in the housing 58. When assembled as above described, the housing 58 maintains the sealing elements 62 and 63 under sufficient pressure to prevent leakage of liquid therebetween or between them and the portion 60 of the body 50 or the shoulder 61 in the housing 58.

The inner surface of the annular sealing element 62 is internally serrated as designated at 64 and an elastic skirt 65, preferably formed of rubber, has one of its ends vulcanized to the serrated surface 64. The other end of the elastic skirt is vulcanized to the serrated inner face 66 of an annular element 67, the latter being slidable with respect to the inner surface of the housing 58. The rod 57 extends through the annular member 67 and has a shoulder 68 and a screwthreaded portion 69 adjacent thereto and receiving nuts 70 for clamping the member 67 against the shoulder 68. Sealing elements 71 and 72 are preferably interposed between the member 67 and the shoulder 68 and between the member 67 and the nuts 70 respectively.

The body 50 is provided with a radially extending nipple 73 supporting an expansion chamber 74 containing a plunger 75 and a spring 76 for normally urging movement of the plunger in a direction to expel liquid from the chamber 74 into the nipple 73. A port 77 extends from the nipple 73 to the chamber 51 at a point close to the outer edge of the seal 54 when the piston 53 is in its retracted position shown in the drawings. A passage 78 extends from the nipple to an internal groove 79 in the body 50, and a groove 80 is provided in the surface of the piston 53 which registers with the groove 79.

With the parts above described in the position shown in the drawings the chamber 51, expansion chamber 74 and interior of the skirt all contain liquid and all are in communication with each other. The spring 75, in acting upon the plunger in the expansion chamber tends to maintain these parts completely filled with liquid, and under a minimum pressure equal to that exerted by the spring 76. When the piston 53 is moved through application of pressure on the rod 57, it will be seen that the piston moves toward the left hand side of the drawings, and that during the initial part of such movement the seal 54 covers the port 77 and severs communication between the chamber 51 and the expansion chamber 74. However, the interior of the skirt 65 remains in communication with the chamber 74 which compensates for volumetric changes within the skirt.

It will be noted, in connection with the disclosure of Fig. 2, that the elastic skirt completely fills the housing 58, and under normal conditions the above mentioned minimum pressure on the liquid maintains it in engagement with the inner surface of the housing. In this form the elastic skirt is stretched and contracted during operations of the actuator and the inherent elasticity of the rubber is relied upon to permit this function. However, Fig. 3 illustrates a collapsing type of skirt, which in formation resembles a sylphon bellows. For an understanding of the structure shown in Fig. 3 the same reference characters applied to Fig. 2 have been employed and the descriptive matter pertaining to Fig. 2 is likewise applicable. In Fig. 3 the bellows type skirt is designated by the numeral 65a and the housing 58 is provided with a plurality of apertures 58a to prevent air from becoming trapped between the skirt 65a and the inner surface of the housing 58.

Although specific embodiments of the invention have been illustrated and described it will be understood that various changes may be made within the scope of the appended claims without departing from the spirit of the invention, and such changes are contemplated.

What I claim is:

1. In a brake actuator, a cylinder, a piston in said cylinder and sealed with respect thereto, said cylinder having a co-axial annular enlargement, an annular body supported in said annular enlargement and forming a secondary chamber, a piston in said secondary chamber, the piston and cylinder being of a smaller diameter than the piston and chamber, a second cylinder supported by said annular body, a piston in said second cylinder and mechanically connected to the piston in said secondary chamber, said second piston and cylinder being of a diameter smaller than the piston and chamber, means separate from said pistons for providing fluid communication between the two cylinders, and a pressure actuated control in said last named means operable independently of movement of the pistons for closing off said communication when fluid pressure in said actuator exceeds a predetermined point.

2. In a brake actuator, a cylindrical body having a chamber therein, a piston in said cylindrical body, an elastic skirt having one end secured to and sealed with respect to said piston and its other end secured to and sealed with respect to the wall of said cylindrical body, said cylindrical body having a co-axial annular enlargement, an annular body supported in said annular enlargement and co-operating therewith in forming a secondary chamber, a piston in said secondary chamber, said cylindrical body and piston being of a smaller diameter than the chamber and piston, a cylinder supported by said annular body and having a fluid outlet, a piston in said cylinder, said cylinder and piston being of a smaller diameter than the chamber and piston, means mechanically connecting the last named piston with said piston in said secondary chamber, and means for connecting the first named chamber to said cylinder, said last named means including a pressure actuated control adapted to operate in the presence of a predetermined pressure to prevent such communication.

3. In a brake actuator, a cylindrical body having a chamber therein, a piston in said cylindrical body, an elastic skirt having one end secured to and sealed with respect to said piston and its other end secured to and sealed with respect to wall of said cylindrical body, said cylindrical body having a co-axial annular enlargement, an annular body supported in said annular enlargement and co-operating therewith in forming a secondary chamber, a piston in said secondary chamber, said cylindrical body and piston being of a smaller diameter than the chamber and piston, a cup-shaped elastic seal having a peripheral flange secured with respect to said annular enlargement by said annular body and enclosing said piston, a cylinder supported by said annular body and having a fluid outlet, a piston in said cylinder, said cylinder and piston being of a smaller diameter than the chamber and piston, means mechanically connecting the last named piston with said piston in said secondary chamber, and means for connecting the first named chamber to said cylinder, said last named means including a pressure actuated control adapted to operate in the presence of a predetermined pressure to prevent such communication.

4. A brake actuator comprising a low pressure chamber, a secondary chamber connected with the low pressure chamber, and a high pressure chamber, a piston in each of said chambers, the secondary chamber and its piston having a diameter larger than the other chambers and their pistons, the secondary chamber piston being movable by fluid displaced from the low pressure chamber and being connected to the high pressure chamber piston to move the latter in unison therewith, fluid conveying means connecting the low pressure and secondary chambers with the high pressure chamber, a valve in said fluid conveying means, resilient means normally holding said valve open, and means extending into said high pressure chamber and adapted to compress said resilient means in the presence of a predetermined fluid pressure in said high pressure chamber to close said valve.

5. A brake actuator comprising a low pressure chamber, a secondary chamber connected with the low pressure chamber, and a high pressure chamber, a piston in each of said chambers, the secondary chamber and its piston having a diameter larger than the other chambers and their pistons, the secondary chamber piston being movable by fluid displaced from the low pressure chamber and being connected to the high pressure chamber piston to move the latter in unison therewith, fluid conveying means connecting the low pressure and secondary chambers with the high pressure chamber, said fluid conveying means including a port in the wall of said high pressure chamber, a valve for controlling said port, resilient means normally holding said valve open, and means extending into said high pressure chamber for actuation by fluid pressure therein and adapted to compress said resilient means and close said valve.

6. A brake actuator comprising a low pressure chamber, a secondary chamber connected with the low pressure chamber, and a high pressure chamber, a piston in each of said chambers, the secondary chamber and its piston having a diameter larger than the other chambers and their pistons, the secondary chamber piston being movable by fluid displaced from the low pressure chamber and being connected to the high pressure chamber piston to move the latter in unison therewith, fluid conveying means connecting the low pressure and secondary chambers with the high pressure chamber, a wall of said high pressure chamber having a bore with which said fluid conveying means communicates, a plug for said bore, and resilient means normally holding said plug in a position permitting fluid flow through said bore, said plug being adapted to move in the presence of sufficient pressure to compress said resilient means to close said bore.

7. A brake actuator comprising a low pressure chamber, a secondary chamber connected with the low pressure chamber, and a high pressure chamber, a piston in each of said chambers, the secondary chamber and its piston having a diameter larger than the other chambers and their pistons, the secondary chamber piston being movable by fluid displaced from the low pressure chamber and being connected to the high pressure chamber piston to move the latter in unison therewith, fluid conveying means connecting the low pressure and secondary chambers with the high pressure chamber, a wall of said high pressure chamber having fluid portage communicating with said fluid conveying means, a plunger mounted adjacent said portage and adapted to be moved to positions opening and closing the same, said plunger having one end disposed subject to fluid pressure in said high pressure chamber, and resilient means at the other end of said plunger for predetermining the fluid pressure at which said plunger moves.

8. A brake actuator comprising a low pressure chamber, a secondary chamber connected with the low pressure chamber, and a high pressure chamber, a piston in each of said chambers, the secondary chamber and its piston having a diameter larger than the other chambers and their pistons, the secondary chamber piston being movable by fluid displaced from the low pressure chamber and being connected to the high pressure chamber piston to move the latter in unison therewith, fluid conveying means connecting the low pressure and secondary chambers with the high pressure chamber, a wall of said high pressure chamber having fluid portage communicating with said fluid conveying means, a plunger mounted adjacent said portage and adapted to be moved to positions opening and closing the same, said plunger having one end disposed subject to fluid pressure in said high pressure chamber, and resilient means at the other end of said plunger for predetermining the fluid pressure at which said plunger moves, said resilient means comprising a rubber spring sealed with respect to the outside of said high pressure chamber.

9. A brake actuator comprising a low pressure chamber, a secondary chamber connected with the low pressure chamber, and a high pressure chamber, a piston in each of said chambers, the secondary chamber and its piston having a diameter larger than the other chambers and their pistons, the secondary chamber piston being movable by fluid displaced from the low pressure chamber and being connected to the high pressure chamber piston to move the latter in unison therewith, fluid conveying means connecting the low pressure and secondary chambers with the high pressure chamber, and control means for controlling communication between said chambers through said fluid conveying means, said control means having means extending into said high pressure chamber for actuation by fluid therein, and resiliently yieldable means normally holding said control open and adapted to hold said control open until a predetermined fluid pressure is present.

CLAUDE SAUZEDDE.